United States Patent [19]

Cain et al.

[11] Patent Number: 4,701,087
[45] Date of Patent: Oct. 20, 1987

[54] PROTECTIVE GATE

[75] Inventors: Jerry T. Cain, Sapulpa; James M. Mason, Tulsa; Tommy D. Rainey, Broken Arrow, all of Okla.

[73] Assignee: SavR Company, Inc., Sapulpa, Okla.

[21] Appl. No.: 770,099

[22] Filed: Aug. 28, 1985

[51] Int. Cl.[4] .............................................. B60P 7/14
[52] U.S. Cl. ....................................... 410/94; 296/61; 410/129; 410/141
[58] Field of Search ...................... 410/52, 89, 93–95, 410/121, 129, 135, 140, 141; 296/57 R, 61, 106

[56] References Cited

U.S. PATENT DOCUMENTS

| | | | |
|---|---|---|---|
| 1,675,701 | 7/1928 | Fitch | 410/94 |
| 2,617,369 | 11/1952 | Udstad | 410/94 |
| 2,715,040 | 8/1955 | Rhoads | 410/140 |
| 2,742,317 | 4/1956 | Chandler | 296/57 R |
| 2,961,271 | 11/1960 | Morris | 410/129 X |
| 4,472,639 | 9/1984 | Bianchi | 296/57 R X |

FOREIGN PATENT DOCUMENTS 1133434  3/1957  France .................................. 296/61

Primary Examiner—Randolph A. Reese
Attorney, Agent, or Firm—William S. Dorman

[57] ABSTRACT

A protective gate adapted to be installed within a freight container such as a truck trailer for protection of the container and its freight from damage during transit wherein the container includes a floor, two opposite side walls, and a rear door for receiving the freight to be transported. The protective gate comprises a rigid plate having top, bottom and side edges wherein the plate is spaced inwardly from the rear door of the freight container, hinges to connect the bottom edge of the plate to the container floor to allow movement of the plate from a position in a plane horizontal to the floor into a position perpendicular to the floor, and a coupling to allow the side edges of the plate to be secured to the container side walls so that the plate is in a position perpendicular to the container floor, thereby preventing movement of the gate relative to the container.

3 Claims, 7 Drawing Figures

PROTECTIVE GATE

BACKGROUND OF THE INVENTION

1. Field of the Invention

The present invention relates to a protective gate adapted to be retrofitted within a movable container such as a truck trailer for protecting the container and its freight from damage during transit.

2. Prior Art

Containerized freight may be shipped by several different modes of transportation, such as rail, truck or vessel, or by any combination. The rear doors of a container such as a truck trailer, for example, are often made of lightweight wood and metal. During transit, the freight can sometimes shift rearward and severely damage the rear doors of the container, and even break the doors and cause the freight to be damaged and spilled.

The present invention is particularly directed to the approximately two million truck trailers presently in use. These intermodal truck trailers are used extensively in rail transportation. Starting, switching or stopping long trains with trailers aboard causes the load inside to shift.

Providing a gate or brace between the freight and the rear doors of a truck trailer or other cargo container is known in the prior art. A patentability search was conducted on the present invention and the following U.S. patents were uncovered in the search:

| Patentee | U.S. Pat. No. | Issue Date |
| --- | --- | --- |
| Cheiger | 3,210,118 | October 5, 1965 |
| Keener | 3,052,485 | September 4, 1962 |
| Vergara | 2,974,988 | March 14, 1961 |
| Prati | 2,720,849 | October 18, 1955 |
| Cutler et al | 1,165,573 | December 28, 1915 |
| Weeks | 2,885,221 | May 5, 1959 |
| Fernandes | 3,000,666 | September 19, 1961 |

Weeks U.S. Pat. No. 2,885,221 shows a movable plate connected and parallel to the rear doors of the container utilizing a gear mechanism. Prati U.S. Pat. No. 2,720,849 shows a movable plate or plates connected to the side walls of a truck trailer. Fernandes U.S. Pat. No. 3,000,666 shows interior arm braces extending to the side walls to protect the rear doors. Keener U.S. Pat. No. 3,052,485 shows interior telescope bars connected to the side walls of a truck trailer to protect the rear doors. The remaining patents listed above are not considered to be sufficiently pertinent as to require any comments.

SUMMARY OF THE INVENTION

The present invention, to be installed within a freight container, is designed to protect the container and its freight from damage due to the shifting of the freight during transit. The present embodiment of the invention is used in conjunction with a truck trailer.

The protective gate includes a rigid plate spaced inwardly from the rear end of the truck trailer by several inches. The plate is hinged along its bottom edge to the floor of the truck.

The protective gate can be moved to an open position in a plane with the truck floor during loading and unloading.

The plate is reinforced by horizontal angle iron members welded to the face of the plate. Vertical angle iron members are welded to the face of the plate between the horizontal angle iron members.

When the gate is in the open position, one of the horizontal angle iron members is adapted to rest against dogs extending from the rear of the truck.

The gate can be moved to the closed position by swinging the plate to a position perpendicular to the floor of the truck trailer. Hinge plates mounted on the side edges of the plate are interspaced with hinge plates mounted on the side walls of the truck trailer. Hinge pins are inserted to lock the protective gate in place.

DETAILED DESCRIPTION OF THE PREFERRED EMBODIMENTS

Figure 4:
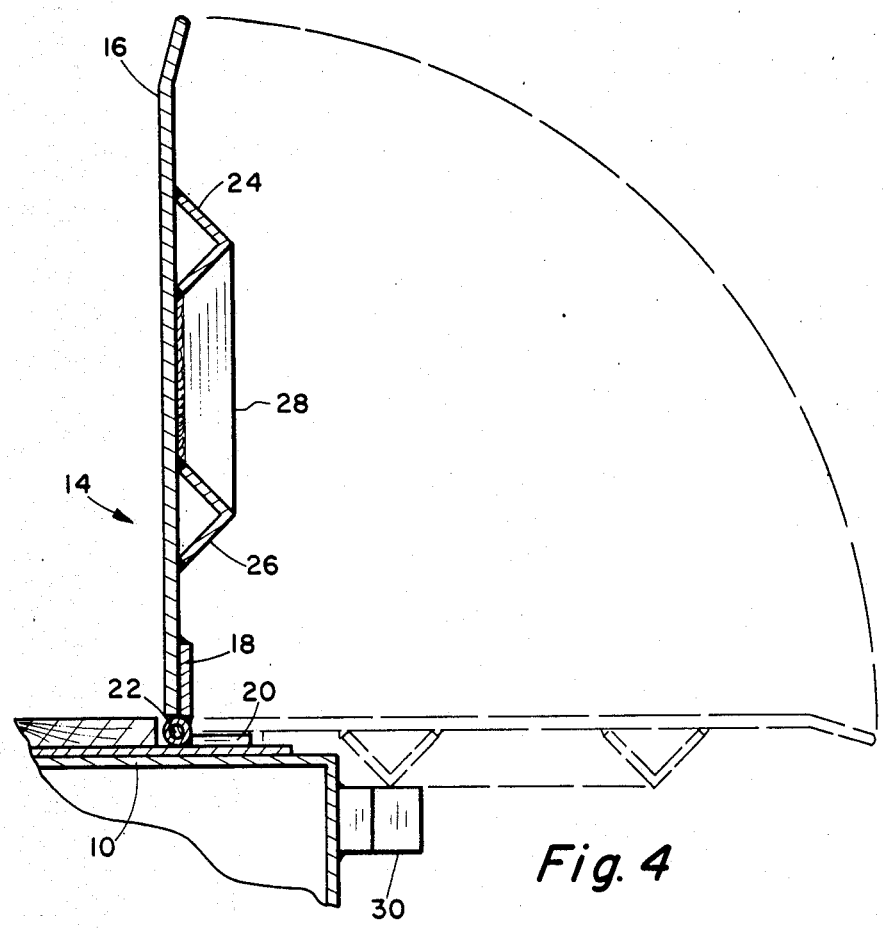
FIG. 4 is a sectional view of the protective gate shown in FIG. 1 taken along section line 4—4 in FIG. 2.

As shown in FIGS. 1 through 7, a protective gate is provided to be used in conjunction with a truck trailer 10 having rear doors 12 shown in the fully open position. The present invention may be retrofitted to existing truck trailers. The protective gate 14 consists of a rigid plate 16 spaced inwardly from the end of the truck trailer 10 by several inches. The plate may be constructed of metal or other sturdy material. The protective gate 14 is hinged along its bottom edge with a hinge consisting of hinge plates 18 mounted on the plate 16 and interspaced hinge plates 20 mounted on the floor of the truck trailer 10. A hinge pin 22 passes through holes in the hinge plates 18 and 20 to complete the hinge. As best shown in FIG. 4, the protective gate 14 can be moved to the open position during loading and unloading of freight (not shown).

Figure 2:
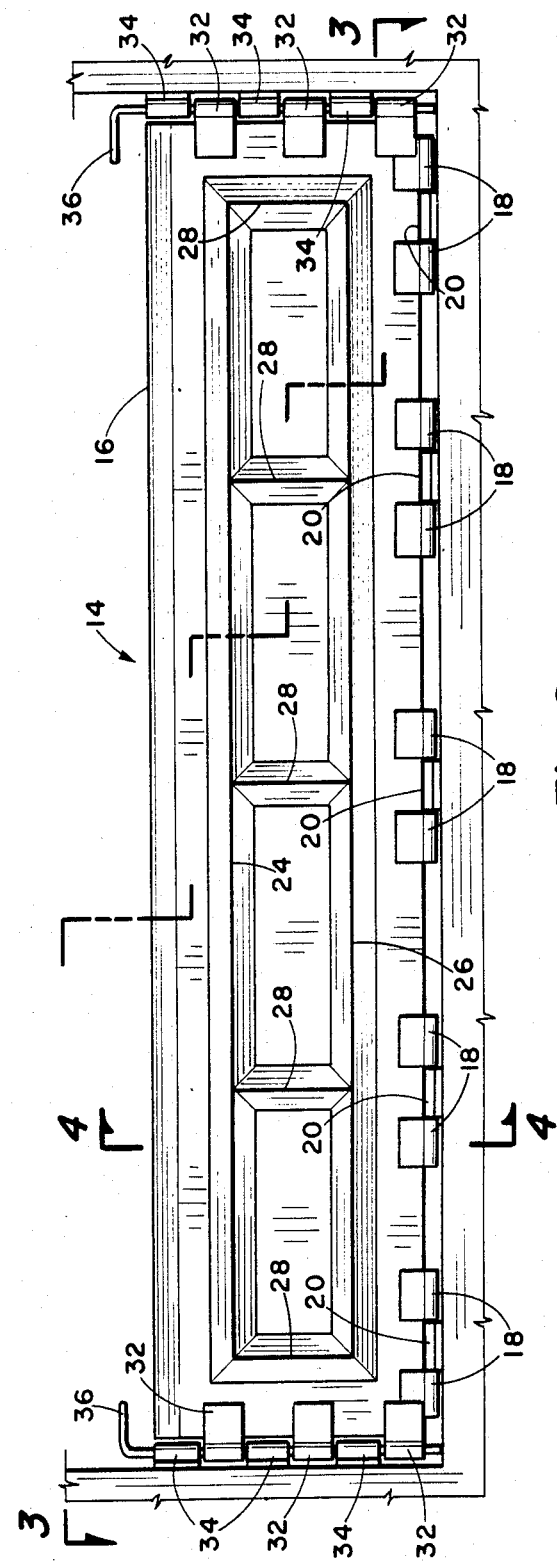
FIG. 2 is a rear view of the protective gate shown in FIG. 1 larger in scale and having greater detail than FIG. 1.

As shown in FIG. 2, the plate 16 is reinforced by horizontal angle iron members 24 and 26 welded to the face of the plate 16. A plurality of vertical angle iron members 28 are welded to the face of the plate 16 between horizontal members 24 and 26. When the gate 14 is in the open position, the angle member 26 is adapted to rest against a plurality of dogs 30, extending from the rear of the truck 10.

In the closed position, the plate is moved perpendicular to the floor of the truck trailer. The sides of the plate 16 are coupled or secured to the sides of the truck trailer 10. Hinge plates 32 mounted on the side edges of the plate are interspaced with hinge plates 34 mounted on the side walls of the truck trailer 10. Hinge pins 36 are inserted to lock the protective gate in place after the freight is loaded.

If the freight were to shift on the floor of the truck trailer 10 towards the rear doors 12, it would hit against the protective gate 14.

Figure 1:
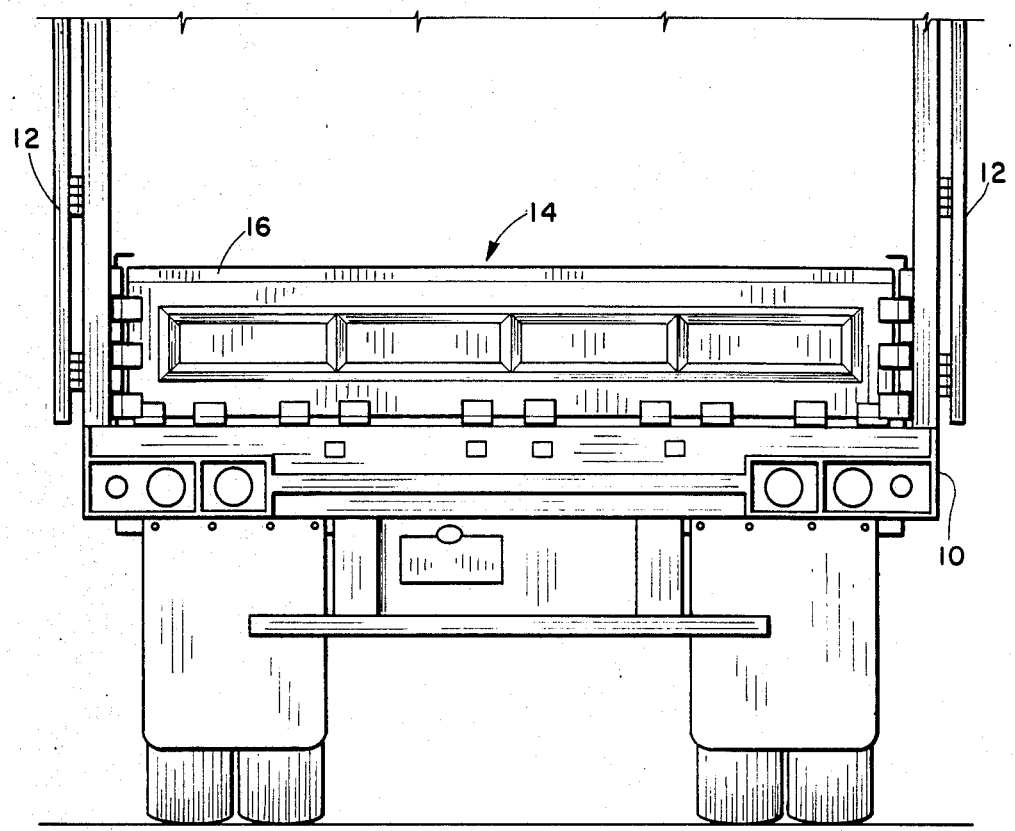
FIG. 1 is a rear view of a truck trailer with its rear doors open showing a protective gate in the closed position which is constructed in accordance with one embodiment of the present invention.
Figure 5:
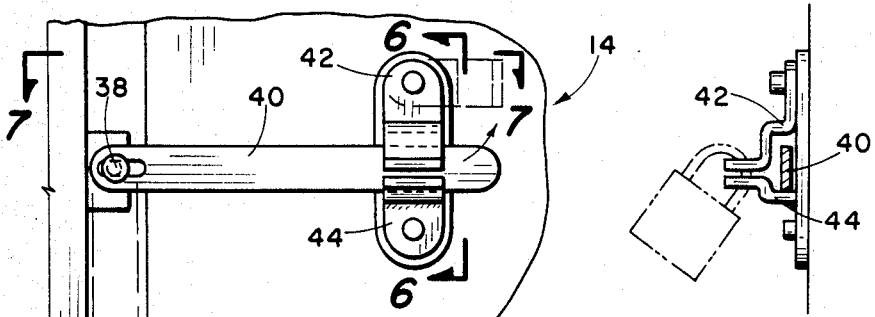
FIG. 5 is an enlarged detailed view showing an optional locking mechanism to be used with the protective gate shown in FIG. 1.
Figure 6:
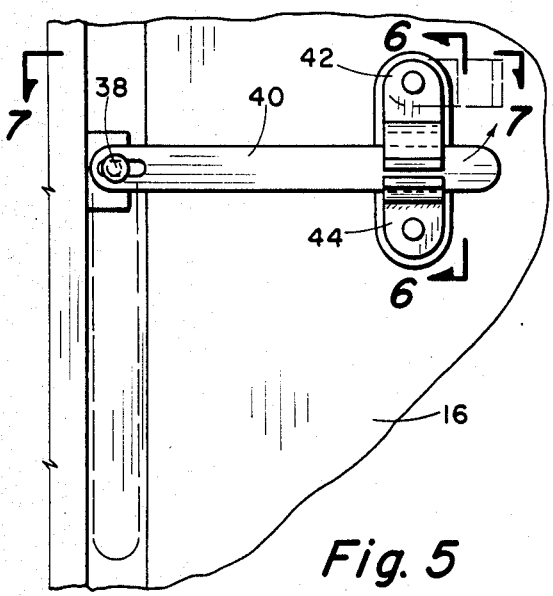
FIG. 6 is a view of the optional locking mechanism taken perpendicular to FIG. 5 along section line 6—6 in FIG. 5.
Figure 3:
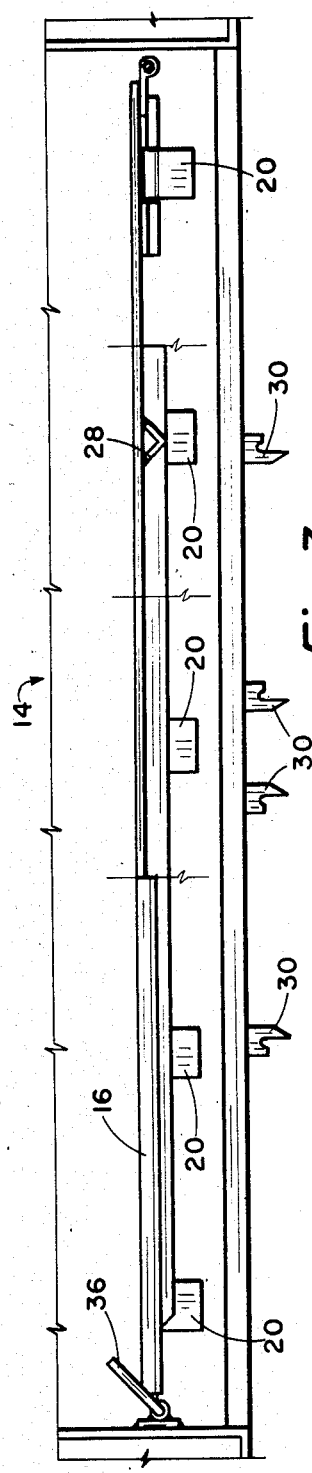
FIG. 3 is a sectional view of the protective gate shown in FIG. 1 taken along section line 3—3 of FIG. 2 with the section line traversing several different levels.
Figure 7:
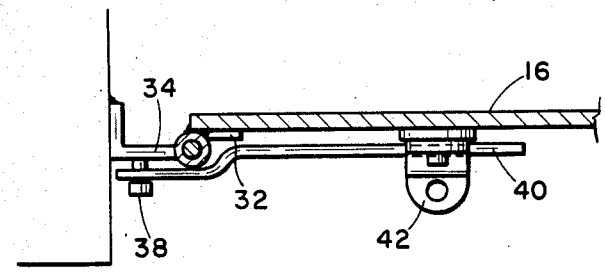
FIG. 7 is a sectional view of the optional locking mechanism taken along section line 7—7 in FIG. 5.

FIGS. 5, 6 and 7 show an optional mechanism (not shown in FIGS. 1 through 4) to lock the protective gate 14 when it is in a closed position. A bolt 38 is secured to one of the hinge plates 34 mounted on the side walls of the truck trailer 10. A flat bar 40, perpendicular to the bolt 38, is adapted so that one end of the bar 40 swings about the bolt 38. The free end of the bar 40 can swing to position it in a latch opening between latches 42 and 44. Each latch has an eye to receive a padlock or other lock.

Whereas the present invention has been described in particular relation to the drawings attached hereto, it should be understood that other and further modifications, apart from those shown or suggested herein, may be made within the spirit and scope of this invention.

What is claimed is:

1. A protective gate adapted to be retrofitted within a truck trailer freight container for protection of said container and its freight from damage during transit wherein said container includes a floor, two opposite side walls, and a pair of center opening rear doors for receiving freight to be transported; said protective gate comprising a rigid plate having top, bottom and side edges wherein said plate is spaced inwardly from said freight container rear doors; a plurality of outer brace members extending from the face of said plate and reinforcing said plate; means for hinging said bottom edge of said plate to said container floor to allow movement of said plate from an open position in a plane horizontal to said floor into a closed position perpendicular to said floor; a plurality of protuberances extending rearwardly from said container floor, such that said outer brace members will rest against said protuberances when said gate is in said open position; and means to couple said plate side edges to said container side walls in a position perpendicular to said container floor, thereby preventing movement of said gate relative to said container.

2. A protective gate as set forth in claim 1 wherein said means to couple said plate to said container includes a plurality of hinge plates with hinge holes therein extending outwardly from said side edges of said plate, a plurality of hinge plates with hinge holes therein extending from said container side walls, and a pair of hinge pins insertable through said hinge holes.

3. A protective gate as set forth in claim 1 including additional latch means to lock said plate in said closed position to one of said container side walls.

* * * * *